United States Patent Office 2,758,057
Patented Aug. 7, 1956

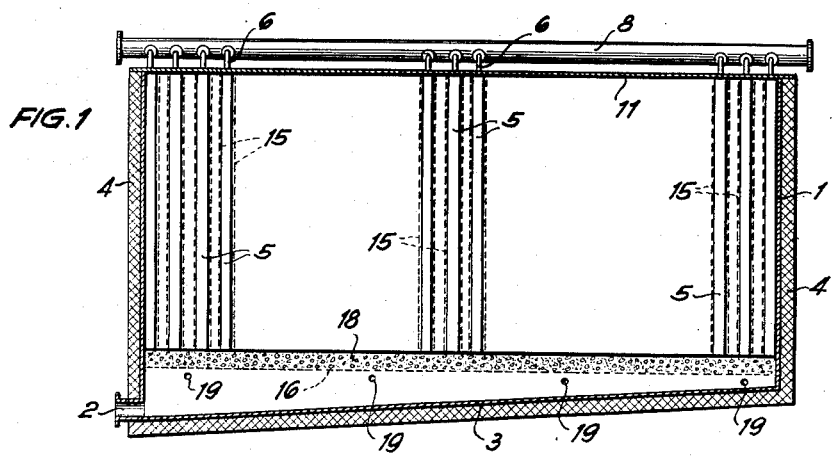

2,758,057

APPARATUS FOR SWEATING PARAFFIN

Robert Lüben, Oberhausen, Germany, assignor to Ruhrchemie Aktiengesellschaft, Oberhausen-Holten, Germany, a German corporation Application August 4, 1953, Serial No. 372,374

Claims priority, application Germany August 20, 1952

12 Claims. (Cl. 196—20)

This invention relates to an apparatus for sweating paraffin.

The freeing of raw paraffin from its oil content has been effected by the so-called "sweating." This process is conventionally effected in sweating chambers which are constructed as either flat, sweating pans or cylindrical, vertical sweaters.

Apart from the large dimensions required in the conventional sweating apparatus, the same have the further disadvantage that they are heated with only a relatively poor heat transfer, generally by means of air, which results in non-uniform temperature conditions within the chamber.

One object of this invention is an apparatus for sweating paraffin, which overcomes the above-mentioned disadvantages and which will effect paraffin-sweating in a highly efficient manner. This, and still further objects, will become apparent from the following description, read in conjunction with the drawings, in which:

Fig. 1 is a vertical, longitudinal section of an embodiment of a sweating apparatus in accordance with the invention;

Fig. 2 is a vertical cross-section of the apparatus in Fig. 1 taken through a heat exchange box 5; and Fig. 3 is a top elevation of the apparatus shown in Fig. 1.

The sweating apparatus in accordance with the invention is in the form of a vessel of preferably rectangular shape. The bottom of the vessel defines an inclined collecting trough. At the base of the vessel above the trough there is a sieve plate. A multiple number of heat-exchange boxes of relatively small thickness, as, for example, 25–60 mm. thickness, are vertically positioned within the vessel. The heat-exchange boxes are preferably positioned parallel to each other and spaced apart at a relatively small distance, as, for example, 50–100 mm. apart. The outer surfaces of the heat-exchange boxes are preferably covered with a fine-meshed wire gauze, as, for example, 2–5 mm. mesh size. The gauze allows the oil to easily flow off in a downward direction and retains the paraffin cake from sliding. The heat-exchange boxes preferably are dimensioned to fit in contact with the side walls of the vessel and the bottom sieve plate, and preferably each of the heat-exchange boxes defines a free-flow space at at least one point to provide free-flow communication throughout the vessel. Each of the heat-exchange boxes is connected with easily detachable connections to main inlet and outlet pipes for a suitable heat exchange medium.

Referring to the embodiment shown in the drawings, the apparatus consists of a preferably rectangular vessel 1, which is provided with a bottom portion 3, which is shaped as a trough and which inclines toward the outlet opening 2. The walls at the bottom of the vessel are provided with insulation layer 4 of suitable thickness. The vessel is provided with a removable insulated multipart cover 11. For filling in the paraffin to be treated which is charged in the liquid state, the cover 11 is taken off. The cover 11 is on both longitudinal sides provided with narrow slots into which the connecting tubes 6 and 7 fit. When the cover 11 is lifted, the paraffin sweating apparatus according to the invention consists of a vessel which is open on top and into which the cooling boxes 5 may easily be inserted and connected to the pipes 8 and 9. Each of the cooling boxes may after disconnection of the respective pipe connections be easily lifted out from vessel 1. After the removal of all cooling boxes, the bottom of vessel 1 is freely accessible. In this state, the sieve plate 16 and the gravel layer 18 located thereupon may be put in or be removed after fouling.

A multiple number of heat-exchange boxes 5 are suspended in the vessel 1 at a small distance from one another, which, for example, may be from 50–100 mm. and may be still smaller. The heat-exchange boxes are in the form of rectangular tanks which fit against the side walls of the vessel 1. The bottoms of the heat-exchange boxes 5 fit against the gravel layer 18 on the sieve plate 16. Each of the heat-exchange boxes is provided with an inlet pipe 7 and an outlet pipe 6, which are connected by means of flanges or other easily detachable connections to the main inlet and outlet pipe 9 and 8, respectively. These pipes parallelly extend along the opposite upper edges of the vessel. The media used for melting, cooling or sweating the paraffin, as, for example, steam, cold water, warm water, air or other gaseous media, are passed into the sweating apparatus and led off therefrom through these pipes 9 and 8, respectively. The lower edges of the heat-exchange boxes 5 define a free-flow opening 17, which allows free liquid communication and thus a uniform filling of the vessel 1 with the liquid oil-containing paraffin. In the interior of each of the heat-exchange boxes 5 there are provided the baffles 10, which are alternately connected at the upper and lower ends, and thus define a tortuous or labyrinth-like passage from the inlet to the outlet through the heat-exchange box, so that the heat-exchange media passed in are distributed uniformly over the interior of each box. The lateral edges of the baffles 10 are suitably welded or riveted to the parallel opposed sides of the boxes of greatest surface area to impart to the latter a sufficient strength against warping or other deformation.

The heat-exchange medium, as, for example, water, air, or steam, is passed in through the pipe 12 as shown in Fig. 3. It is led off through the pipe 13. It is also possible to operate with a recycling of the heat-exchange medium. For this purpose, the medium is pumped from the main outlet conduit 5 through the heat-exchange 14, back to the main inlet conduit 9.

For a clearer representation, only some of the heat-exchange boxes 5 are plotted in the drawing. In practice, the vessel 1 is completely filled out with boxes 5, the distance from one another of which corresponds approximately to the thickness. It is also possible to use greater distances between the individual boxes. Also, some boxes may be missing in the succession of boxes thus providing a better possibility of filling in the liquid paraffin.

The liquid paraffin is fed by means of a main pipe arranged above the vessel 1, which is favorably movable and from which branch lines extend which are inserted into the interspace between two successive cooling boxes. The main pipe used for feeding the paraffin is well insulated and suitably provided with a heating device in order to prevent the liquid paraffin from solidifying within this pipe.

The two outer surfaces of each heat-exchange box 5 are coated with a wire gauze 15. Preferable for this purpose is a conventional screen wire having a mesh size of, for example, 2–5 mm. The sweating spaces are defined between successive heat-exchange boxes and are thus bounded on both sides by a wire gauze, which facilitates the efflux of the oily constituents sweated out.

Below the heat-exchange boxes, the sieve plate 16 is positioned. This sieve plate may, for example, be in the form of a wire net and is covered with a layer 18 of coarse gravel of about 10–20 mm. in diameter. The sieve plates prevent the material being sweated from falling through onto the trough-shaped bottom of the vessel.

In operation the vessel 1 is first filled with water to a level of about 10–20 mm. above the gravel layer 18 lying on the sieve plate 16. The level of the water may be exactly controlled, for example, by means of an overflow pipe. This overflow pipe which is not shown in the drawing is suitably installed in height of the lower edge of the cooling boxes and provided at its discharge end with a discharge cock. During the filling of the water, the cock of this overflow pipe is opened while the discharge pipe 2 (see Fig. 1) remains shut. Under these circumstances, the water can rise only to the overflow pipe installed in height of the lower edge of the cooling boxes. In this way, it is attained that a water stock which extends only to the lower edges of the cooling boxes collects within the vessel 1. Prior to filling in the melted paraffin, the discharge cocks of the tubes for the overflow of the water installed in height of the lower edge of the cooling boxes are shut. The container is then heated by filling the heat exchange boxes 5 with hot water by passing the same in through the inlet 12 through the main inlet conduit 9 into the individual inlets 7. The vessel is then filled with the raw paraffin to be sweated and the same is cooled. If the space of the vessel 1 above the water stock present in the lower part is completely filled with paraffin, cold water is passed through the cooling boxes 5 by means of the pipe 9 and the connecting pipes 7. This water, after corresponding warming, runs off through the connecting pipes 6 and the main pipe 8. During the cooling process, the water passed through heats up. By the further influx of cold water or by cooling of the water flowing through, the paraffin filling is gradually completely solidified. Thereby, a considerable contraction of the paraffin occurs. The hollow spaces forming thereby are several times filled up with liquid paraffin until the entire vessel 1, so far it is not occupied by the cooling boxes, is filled with a solid paraffin cake. It is advisable to cool at a slow rate in order to assure a good crystallization. After termination of the cooling, the sweating process proper is commenced.

The outlet opening 2 is opened and the water and oil, which has already separated during the crystallization, flow off through an oil-water separator. Thereafter heat-exchange media such as water, which has been heated exactly to the sweating temperature, is passed through the heat-exchange boxes. The temperature of the heat-exchange medium is slowly raised when required. The progress of the sweating process may be continuously controlled by inspection of the fluid products. During the entire sweating process the outlet pipe 2 remains open to allow the oil separating from the paraffin to continuously flow off. The process is terminated when the fluids no longer contain oil. Finally, the de-oiled paraffin is melted by means of indirect steam, which is passed in place of the water through the heat-exchange boxes 5. The melting of the de-oiled paraffin may also be effected by direct contact with steam passing through the nozzles 19. The melted paraffin is then removed from the apparatus.

It is possible with the apparatus in accordance with the invention to effect the treatment of the paraffin at temperatures which may be very exactly controlled and adjusted. The very favorable heat-transfer which takes place from the heat-exchange media through the walls of the heat-exchange boxes 5, which may, for example, consist of sheet iron, to the thin paraffin layer present between successive heat-exchange boxes, results in a substantial shortening and improvement of the sweating process. It is thus possible with the use of the apparatus in accordance with the invention to treat large quantities of paraffin in a relatively short time. The apparatus therefore requires no special chambers and a relatively small space. The maintenance of the apparatus is extremely simple, and the individual heat-exchange boxes may easily be replaced in case repairs become necessary.

I claim:

1. Apparatus for sweating paraffin, which comprises a vessel of substantial depth defining a collecting trough at the lower portion thereof, a substantially horizontal sieve plate positioned above said collecting trough, a multiple number of closely spaced-apart heat-exchange boxes vertically positioned in said vessel above said sieve plate, substantially parallel to each other, and means for passing heat-exchange media through said heat-exchange boxes.

2. Apparatus according to claim 1, in which said heat-exchange boxes are removably positioned in said vessel.

3. Apparatus according to claim 1, in which said heat-exchange boxes have a thickness of 25–60 mm.

4. Apparatus according to claim 1, in which said heat-exchange boxes are spaced apart a distance of 50–100 mm.

5. Apparatus according to claim 1, in which said means for passing heat-exchange media through said heat-exchange boxes includes a main inlet conduit having an inlet connection to each of said heat-exchange boxes and a main outlet conduit having an outlet connection from each of said heat-exchange boxes.

6. Apparatus according to claim 5, in which said connections are detachable connections.

7. Apparatus according to claim 6, in which said inlet connections are positioned on one side of the upper portion of said heat-exchange boxes and said outlet connections on the other side of the upper portion of said heat-exchange boxes, and which includes baffle means positioned within said heat-exchange boxes defining a labyrinth path of flow from said inlet to said outlet connection.

8. Apparatus according to claim 1, in which said means of passing heat-exchange media through said heat-exchange boxes includes an inlet and outlet connection for each box, and which includes baffle means positioned within each box to define a labyrinth path of flow from said inlet to said outlet connection.

9. Apparatus according to claim 1, in which said collecting trough is an inclined collecting trough defining an outlet at the lower end thereof.

10. Apparatus according to claim 1, in which the outer surfaces of said heat-exchange boxes are covered with a fine-meshed wire screen.

11. Apparatus according to claim 10, in which said fine-meshed wire screen has a mesh-size of 2–5 mm.

12. Apparatus according to claim 1, in which the bottoms of said heat-exchange boxes are indented to define a free-flow space therethrough to thereby provide free-flow communication in said vessel around said boxes.

References Cited in the file of this patent

UNITED STATES PATENTS

| | | |
|---|---|---|
| 942,917 | Kuebler | Dec. 14, 1909 |
| 999,628 | Campbell | Aug. 1, 1911 |
| 1,504,923 | Allan et al. | Aug. 12, 1924 |

FOREIGN PATENTS

| | | |
|---|---|---|
| 205,245 | Great Britain | Oct. 18, 1923 |